(No Model.)

O. E. MILES.
PLOW.

No. 259,894. Patented June 20, 1882.

WITNESSES
Fred. G. Dieterich
Charles H. Baker

INVENTOR
Owen E. Miles
by Louis Bagger & Co.
Attorneys

UNITED STATES PATENT OFFICE.

OREN E. MILES, OF CEDAR RAPIDS, IOWA, ASSIGNOR TO DANIEL H. RICHARDS, OF SAME PLACE.

PLOW.

SPECIFICATION forming part of Letters Patent No. 259,894, dated June 20, 1882.

Application filed April 7, 1882. (No model.)

*To all whom it may concern:*

Be it known that I, OREN E. MILES, of Cedar Rapids, in the county of Linn and State of Iowa, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification, and in which—

Figure 1:
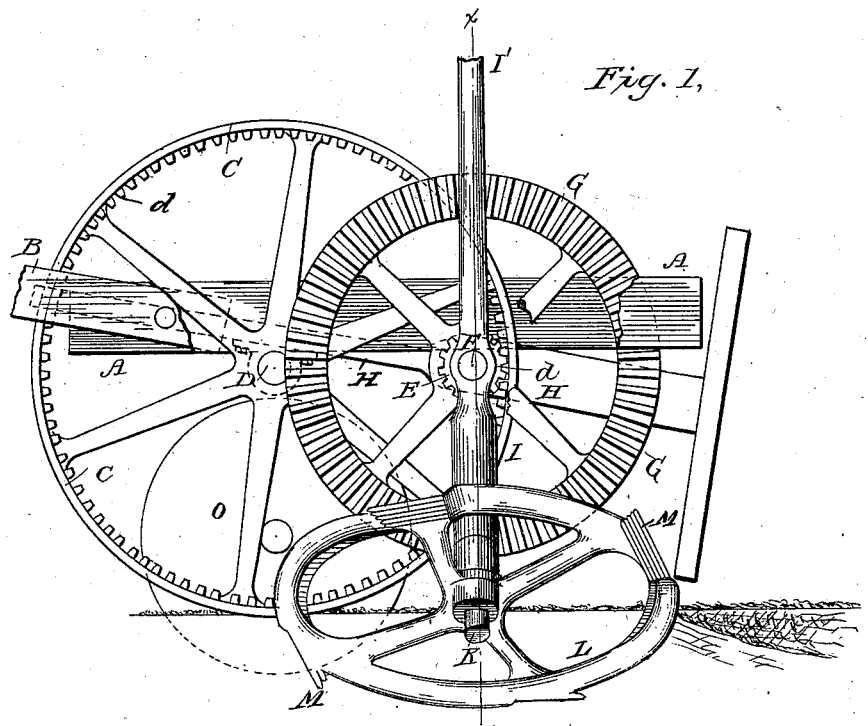
Figure 2:
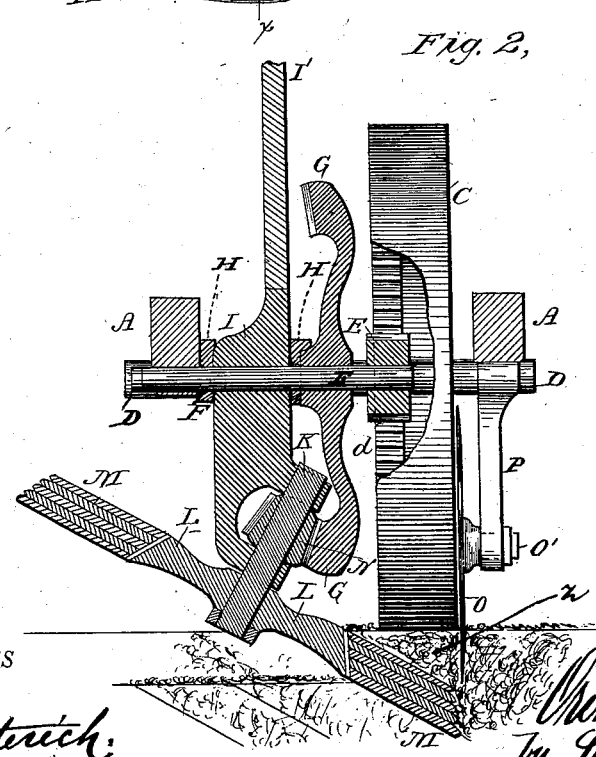

Figure 1 is a side elevation of my improved plow, showing the essential elements of the same; and Fig. 2 is a rear elevation, partly in section, on the vertical line $x\ x$ in Fig. 1.

Similar letters of reference indicate corresponding parts in both the figures.

My invention has relation to rotary plows; and it consists in the construction and combination of parts of a plow of that class which is adapted to cut a trench or furrow diagonally into the earth by means of a revolving cutter-head operating in conjunction with a rotary colter revolving in a vertical or inclined plane in such manner that a triangular slice of sod or surface-soil is cut loose and dropped into the trench or furrow with its original surface upward, or without reversing it, the slices of earth being successively covered by the pulverized earth removed from under the slices by the rotary cutter-head in cutting them. To this end I construct my plow with a vertical, or approximately vertical, colter or cutter which operates in conjunction with a rotary cutter-head, the plane of motion of which is inclined more or less to the horizontal, so as to intersect in its course the cut made by the colter a suitable distance below the surface of the soil, according to the desired thickness of the slice of earth or sod cut loose and the depth of the diagonal trench which is to receive the same.

My improved plow may be worked either by horse or steam power, and in the latter case either by a traction-engine or by an engine mounted upon or forming part of the plow itself.

In the drawings hereto annexed I have shown a plow adapted to be operated by horsepower; but all non-essential parts have been omitted for the purpose of showing more clearly the essential operating parts of my invention.

A designates a suitably-constructed frame, in the front end of which is fixed the pole or tongue B, to which the draft is applied when the machine is to be operated by horse-power. C is the drive or master wheel, the axle D of which may be journaled in the frame A or be rigidly attached thereto. In the latter case the master-wheel will of course run loosely upon it. The function of this wheel as a drive-wheel remains the same whether it is attached loosely or rigidly to the axle. To avoid a repetition of terms I shall call this wheel henceforth simply the "master-wheel."

The master-wheel C is provided with a gear, $d$, which meshes with a pinion, E, upon shaft F of the bevel cog wheel G. Said gear $d$, which is shown in the annexed drawings as an internal gear, may, however, be an external gear, if desired, according to whether it is desired to give a right-hand or left-hand rotation to the cutter-head.

If the plow is to be operated by a steam-engine mounted upon or forming part of itself, said engine may be arranged to exert its power directly upon shaft F, or upon an intermediate counter-shaft, in which case the master-wheel C simply operates as a drive-wheel or ground-wheel, in conjunction with other ground-wheels, as means of locomotion.

In the present illustration of my invention shaft F is journaled in a pair of arms, H, which are hinged to the shaft D of the master-wheel, as shown in dotted lines in Fig. 1, suitable means being provided for retaining the position of arms H at any desired angle. In the position of the parts as shown in Fig. 1 shaft or axle D of the master-wheel and shaft F of pinion E and gear-wheel G are in a line with each other, and hence in Fig. 2 the forward shaft, D, is partially concealed from view by shaft F, which, however, does not extend beyond the pinion E, keyed upon its outer end. By adjusting—*i. e.*, raising or lowering—the arms H shaft F, with its adjuncts, may be raised or lowered to regulate the depth of cut, and as the arms H are pivoted upon shaft D of the master-wheel C so as to move in the arc of a circle, it follows that pinion E will at all times mesh with the gear $d$ of wheel C, irrespective of the adjustment of arms H.

Upon shaft F is hung a frame of cast or wrought metal, I, the upper end of which terminates in a lever or handle, I', while in its lower end is mounted obliquely a short shaft, K, to the lower end of which is affixed the cutter-head L, consisting of a disk or wheel, the periphery of which is provided with a series of cutters, M.

I do not confine myself to any particular construction of said cutters, as they may be made in many different ways, according to the nature of the soil in which the plow is to be used; but it is convenient to construct them of parallel steel bars pointed or sharpened at their outer ends and arranged in sets, substantially in the same manner as the blades in a millstone-pick, so that if one is broken or injured it may be readily removed and a fresh one substituted.

Shaft K has a bevel-pinion, N, which meshes with the bevel-wheel G, and it follows that as the latter is rotated it will impart a rotary motion to the cutter-head L, with its cutters M. The arms H, being hung in the manner described, afford a ready means for regulating the vertical depth of the trench cut by the cutters M, and by pushing the handle or lever I' toward the front end of frame A the swinging frame or casting I, which is pivoted upon shaft F, may be made to assume a nearly horizontal position, thus raising the cutter-head L clear off of the ground, suitable means (which will readily suggest themselves) being provided for securing said frame I in this or in its upright working position, as the case may be.

The vertical, or approximately vertical, cut into the soil intersecting the oblique cut or excavation (for it is more in the nature of an excavation) made by the rotary cutter-head is produced by a rotary sharp-edged disk or colter, O, the short shaft or stub-axle O' of which is journaled in a pendant, P, of frame A in proximity to the master-wheel C. By making the arm or pendant P adjustable in frame A the depth of the vertical cut made by colter O may be regulated at will.

In operating the machine a triangular slice (shown at $z$ in Fig. 2) is cut from the surface of the soil by excavating in an oblique direction underneath it, in conjunction with the vertical cut made by the colter. The excavated earth is thrown out of the cut or furrow by the cutters M, so as to cover the slices of earth or sod occupying the furrows last made, after which the triangular slice of earth falls back into its own furrow right side up, as hereinbefore stated, to be in turn covered in the same manner, and so on, the amount of earth excavated depending upon the width of the cutters M and the radial depth to which the cutter-head penetrates the earth.

If desired, the cutter-head L, with its cutters M, may be provided with a hood or shield to prevent accident, and also to serve as an apron or deflector to arrest the flying earth as it is thrown out from the trench or furrow by the cutters or excavators M and cause it to drop down over and upon the slices of earth occupying the furrows last made.

Having thus described my invention, I claim and desire to secure by Letters Patent of the United States—

1. The improved method of plowing herein shown and described, the same consisting in cutting a triangular slice from the soil along the furrow to be made by a vertical cut and excavating underneath said slice, causing it to drop, right side up, into the trench or furrow being made, and spreading the excavated earth over the slices of soil deposited in the trenches last made, substantially as shown and set forth.

2. A plow adapted to cut off a slice of earth triangular in cross-section from the surface of the soil by a vertical cut and excavating underneath the same, causing the slice of earth to drop into the bottom of the trench or furrow right side up, substantially as set forth.

3. In a plow, the combination, with a rotary cutter or colter cutting in a vertical, or approximately vertical, plane, of an oblique cutter or cutter-head adapted to excavate earth in an oblique direction from the surface of the soil to its point of intersection with the cut made by the rotary cutter or colter, substantially as and for the purpose herein shown and set forth.

4. The combination, in a rotary plow, of the master-wheel C, shaft F, pinion E, bevel-wheel G, frame I, hung upon shaft F, and having the handle or lever I', shaft K, mounted in said frame and provided with the bevel-pinion N and rotary cutter-head L, and the rotary colter or cutting-disk O, all constructed and combined to operate substantially in the manner and for the purpose herein shown and specified.

In testimony that I claim the foregoing as my own I have hereunto affixed my signature in presence of two witnesses.

OREN E. MILES.

Witnesses:
D. H. RICHARDS,
HENRY MONTILLON.